United States Patent [19]

Veillon

[11] 4,411,297
[45] Oct. 25, 1983

[54] WOOD WORKING JOINTER DEVICE

[76] Inventor: Armas Veillon, 11925 Mockingbird La., Walker, La. 70785

[21] Appl. No.: 81,691

[22] Filed: Oct. 4, 1979

[51] Int. Cl.³ ............................................. B27C 1/02
[52] U.S. Cl. .............................. 144/129; 144/117 B; 144/363
[58] Field of Search ............... 144/2 R, 114 R, 117 R, 144/117 B, 127 R, 129, 117 A, 134 R, 134 A, 363

[56] References Cited

U.S. PATENT DOCUMENTS

| | | | |
|---|---|---|---|
| 1,054,073 | 2/1913 | Zimmermann | 144/134 A |
| 1,335,547 | 3/1920 | Bird et al. | 144/134 A |
| 2,782,817 | 2/1957 | Steiner | 144/117 B |
| 2,783,796 | 3/1957 | Patterson | 144/117 B |
| 3,838,722 | 10/1974 | Downing | 144/117 B |
| 4,114,665 | 9/1978 | Decker | 144/117 B |

*Primary Examiner*—W. D. Bray

[57] ABSTRACT

A work bench embodying features for inverting the mounting of a relatively small woodworker jointer by 90 degrees from its customary position therefore changing it to a horizontally oriented device, provided with a vertical wall-like member for the mounting of the jointer on its inner side and a motor on its outer side. A work surface is provided which is sufficiently wide and long to facilitate precision edge planning of workpieces of like nature. The work surface is positioned at the bottom of said vertical wall, inwardly sufficiently to allow a clearance for mounting of the jointer without overlapping of the work surface. The work bench assembly also includes provisions for varying the angles of the work surface for bevel cutting on the edge of workpieces. This device also includes an improved safety feature evolving from the use of the jointer guidefence on the safety guard. Said safety guard, as it is now called, extends longitudinally over the two faces of the jointer, thus forming a barrier between the operator's hands and the cutting knives as workpiece is slidably processed between the work surface and the safety guard.

3 Claims, 6 Drawing Figures

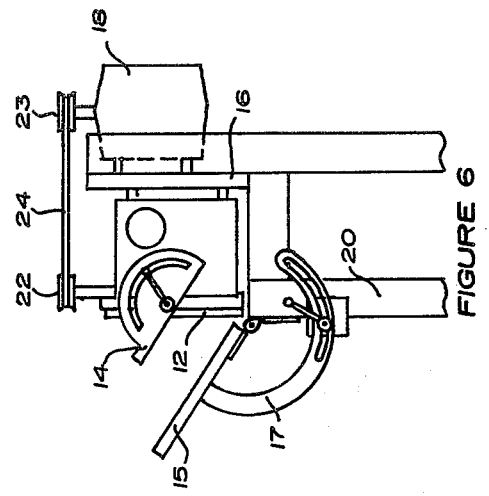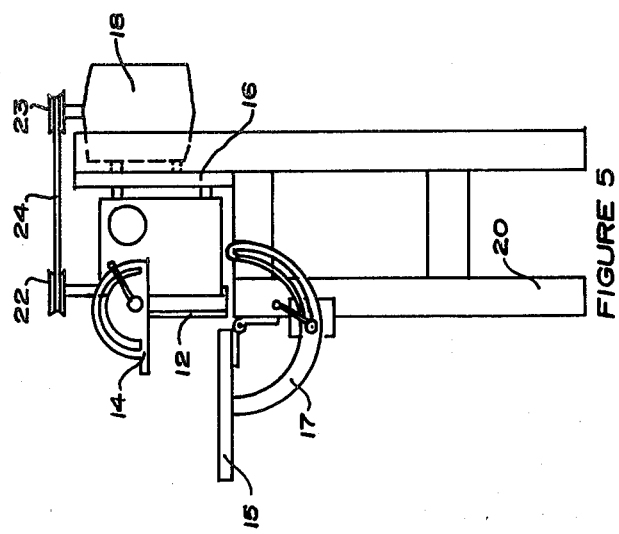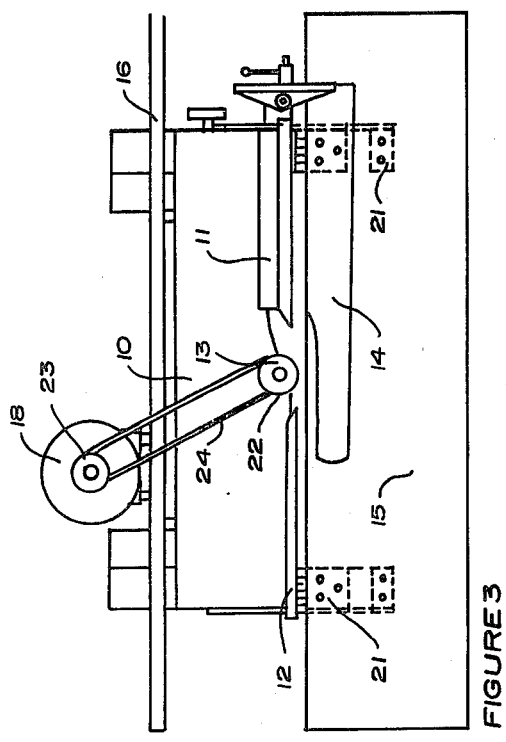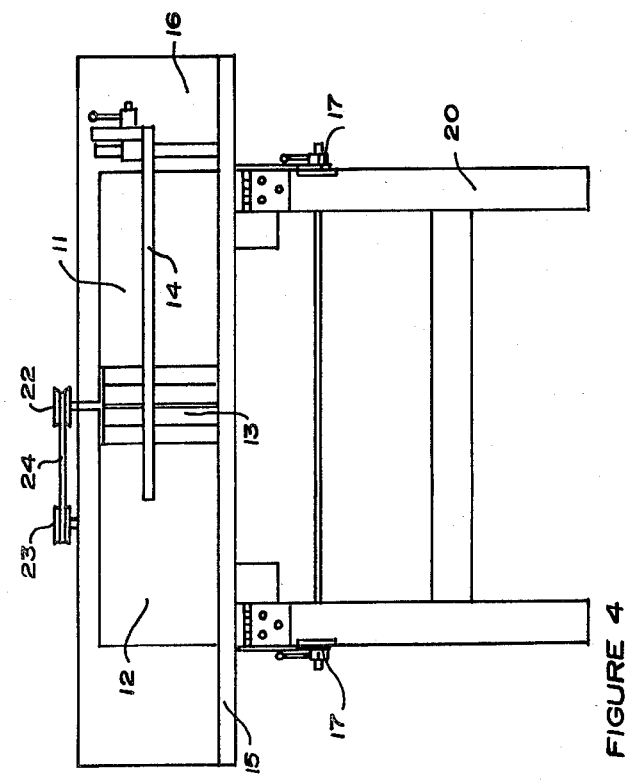

WOOD WORKING JOINTER DEVICE

My invention relates to a change in the manner in which a power jointer woodworking tool is operated, the jointer as a device for planing the edges of woodpieces which have to be straight, smooth and square cut particularly for gluing pieces together as in making table tops and the like, should be capable of accommodating a wide variety of workpieces.

This task be comes very difficult to achieve when working with a conventional jointer, particularly when working with wide and/or long workpieces. It is almost impossible to hold such workpiece straight on its edge while sliding it on top of the jointer bed to engage the vertically rotating cutting knives. The board also becomes imbalanced upon the relatively short bed of the jointer, thus increasing the difficulties.

With these observations in mind, it is the aim of my invention to provide a workbench for a relatively small woodworking jointer featuring a flat horizontal work surface or table assembly on which to lay the workpiece flat, wherein the gravity force keeps it in alignment with the two faces of the jointer. The work surface is made sufficiently wide and long for the accommodation of wide and long workpieces, as well as small ones. The workbench assembly also features provisions for the mounting of the jointer in a vertical plane to change it to a device which is horizontally oriented instead of vertically, as it customarily is used. The workbench assembly also features an improved safety guard evolving from the jointer guide-fence which is used as the safety guard.

The table assembly being positioned parallel to and approximately ⅜ in. from the two faces of the vertically mounted jointer, slightly above the bottom edge of the cutting knives. The workpiece is then slid longitudinally against the faces of the jointer.

Another advantage relative to this invention is that the operator of the machine can see the cutting being performed and is in a better position to hold the workpiece firmly against the faces of the jointer, thus accomplishing better quality of work at a faster rate, as well as with more safety. The table assembly can also be made to adjust at selective angles to facilitate bevel cutting on the workpiece. Further objects and features of the invention will become more apparent from the drawings thereof.

FIG. 3 is a top view of the assembly showing the hinges through the work surface.

FIG. 4 shows a front view of the cutting knives with the safety guard extending over the two faces of the jointer.

FIG. 5 is an end view with the work surface adjusted at a 90° angle from the faces of the jointer.

FIG. 6 shows an end view of the assembly with work surface adjusted for bevel cutting on the workpiece.

Figure 1:
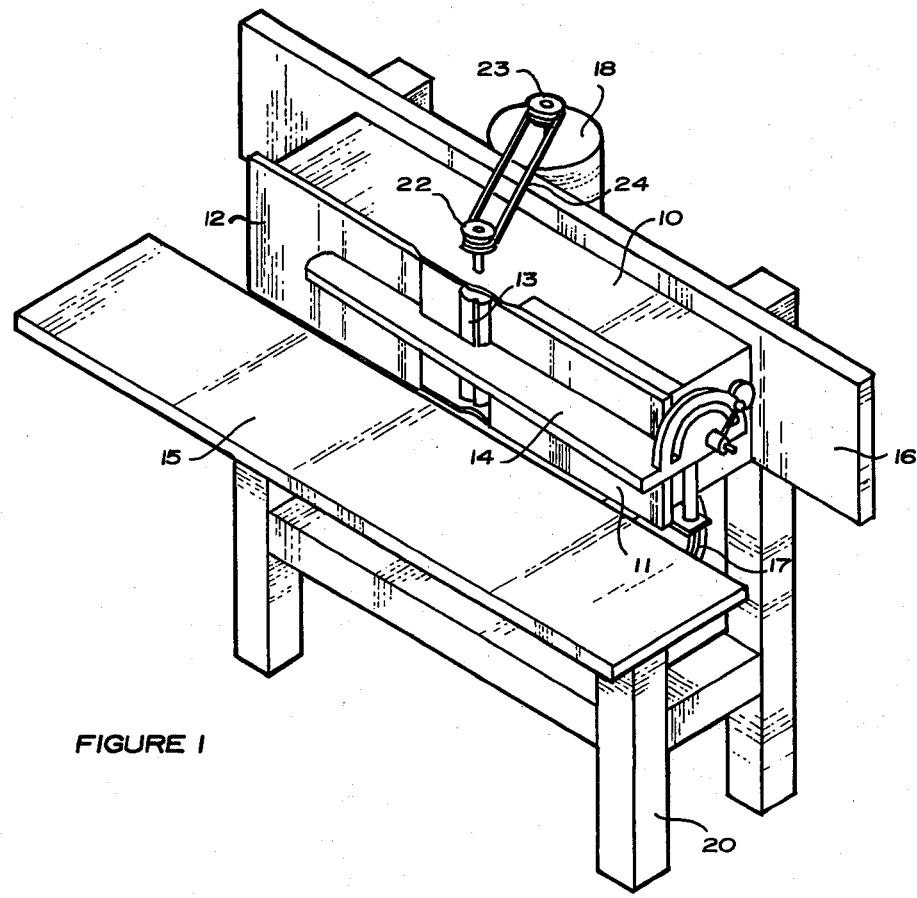
FIG. 1 is a perspective view showing the bench with the jointer in place.

Referring to the drawing numerals, there is shown a power woodworking jointer in place illustrated at 10 which is mounted on the inner side of bench member 16 with its pulley 22 being slightly higher than the top edge of member 16 which is positioned at right angle, and outwardly from the back edge of table assembly 15, sufficiently to allow clearance for the erection of jointer 10 without overlapping of the work surface 15. Motor 18 is mounted on the outer side of bench member 16 with its pulley 23 being in alignment with jointer pulley 22. Motor 18 is mounted in a manner which places its pulley 23 in a diagonal position from the jointer rotary pulley 22 as needed to facilitate tension on transmission belt 24 linking the two pulleys.

Figure 2:
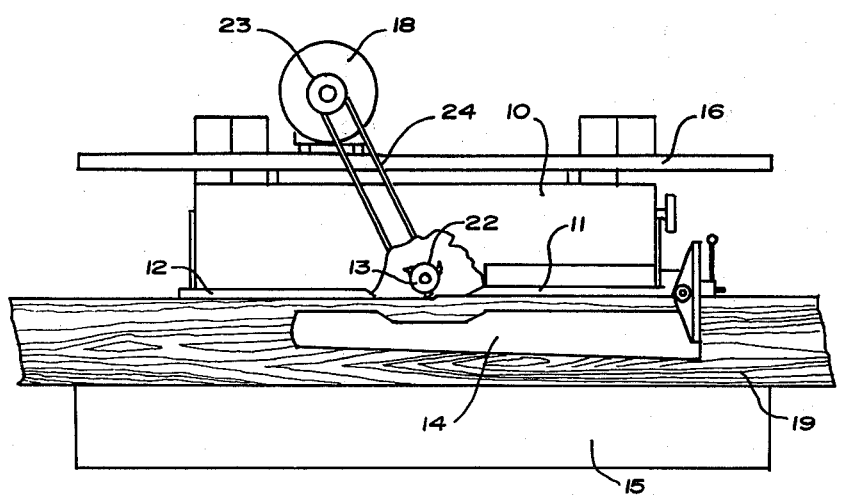
FIG. 2 is a top view of the assembly showing the workpiece being processed between the work surface and the safety guard.

Table assembly 15 is made substantially longer than jointer 10 extending beyond it at both ends to accommodate the processing of long workpieces as illustrated at 19, FIG. 2. Table assembly 15, which is substantially wide to accommodate wide workpieces, can be made to adjust to different angles to facilitate bevel cutting on the workpiece, by means of hinges 21-21, therefrom maintained in angular positions by means of brackets 17-17 which are made flat, edgewisely rounded and slotted to receive clamping bolts which project through slots as shown in FIG. 6. The brackets are anchored from the underside or work surface 15 near both ends, extending backwardly anchoring to frame structure of work bench. Guidefence 14 which now becomes the safety guard is adjustable to different angles to provide a slot for the workpiece when table assembly 15 is adjusted to facilitate bevel cutting as illustrated in FIG. 6. Safety guard 14, which envolves from the use of the jointer guidefence, is positioned extending over faces 11 and 12 of the jointer 10, thus crossing over cutting knives 13, thus forming a barrier to the operator's hands in keeping them from coming into contact with the cutting knives.

Jointer 10 and motor 18 being mounted by means of bolts projecting through holes provided on their bases for that purpose are not standardized, thus mounting holes have to be drilled in support member 16 to match those of jointer 10 and motor 18. While the invention has been illustrated in connection with specific arrangements of parts, the support structure of the bench may be altered to suit the manufacturer. My invention makes no claims on support factors such as legs or frame work, only on the essential parts which bring forth the principle of operation to make possible improved workmanship on a wider variety of workpieces, improved safety features, and ease of operation with minimum cost to the small woodworker.

As all small woodworking jointers are, in essence, made alike, it was deemed unnecessary to fully describe it. Those interested in the invention are skilled in the art, therefore my description of the invention should become clear.

I claim:

1. A workbench for utilizing a small motor driven wood working jointer for the precision planing of edges of wooden workpieces comprising in combination: a support frame having an elongated horizontally disposed table assembly pivotally mounted thereon, at one side of said frame, said table assembly defining means for supporting and guiding a workpiece placed thereon, a vertically disposed upright wall-like member having opposite side faces attached to said support frame at a side opposite said table assembly; power means attached to said upright wall-like member on one side thereof; jointer means mounted on said upright member at an opposite side thereof and being disposed intermediate the length of said table assembly, said jointer means comprising rotatable wood working tool means operatively connected to said power means; and flat jointer face members disposed on opposite sides of said tool, said table assembly and said face members being perpendicularly disposed in non-overlapping relation.

2. The workbench of claim 1 wherein the axis of rotation of said tool means lies in a vertical plane, and further including hinge means connecting said table assembly to said support frame for facilitating rotation of said assembly whereby a bevel may be cut into workpieces guided on said assembly past said tool means, and clamping means connected between said table assembly and said supporting frame for maintaining a selected angle of inclination of said table assembly.

3. The workbench as defined in claim 1 including, safety guard means operatively associated with said tool means, said safety guard being spaced from and disposed above said table assembly and extending substantially along the extent of said jointer face members; said safety guard means being pivotally mounted and adjustable for maintaining or varying the spacing between said guard means and said table assembly.

* * * * *